United States Patent
Hideshima et al.

(10) Patent No.: US 12,240,059 B2
(45) Date of Patent: Mar. 4, 2025

(54) DEVICE FOR MANUFACTURING THREE-DIMENSIONAL SHAPED OBJECT AND METHOD FOR MANUFACTURING THREE-DIMENSIONAL SHAPED OBJECT

(71) Applicant: Seiko Epson Corporation, Tokyo (JP)

(72) Inventors: Yasutoshi Hideshima, Matsumoto (JP); Hidefumi Nakamura, Hachinohe (JP)

(73) Assignee: SEIKO EPSON CORPORATION (JP)

( * ) Notice: Subject to any disclaimer, the term of this patent is extended or adjusted under 35 U.S.C. 154(b) by 831 days.

(21) Appl. No.: 16/658,212

(22) Filed: Oct. 21, 2019

(65) Prior Publication Data
US 2020/0122356 A1  Apr. 23, 2020

(30) Foreign Application Priority Data

Oct. 22, 2018  (JP) .................. 2018-198564

(51) Int. Cl.
*B23K 35/02* (2006.01)
*B22F 10/14* (2021.01)
(Continued)

(52) U.S. Cl.
CPC .......... *B23K 35/0244* (2013.01); *B22F 10/14* (2021.01); *B22F 10/28* (2021.01);
(Continued)

(58) Field of Classification Search
CPC ... B28B 1/001; B28B 11/243; B28B 17/0081; B28B 1/32; B28B 1/30; B28B 1/00; B22F 10/20; B22F 2304/10; B22F 1/052; B22F 10/10; B22F 3/02; B22F 12/00; B22F 5/10; B22F 7/02; B22F 1/065; B22F 9/026; B22F 1/054; B22F 1/148; B22F 1/10; B22F 3/004; B22F 10/85; B22F 10/14; B22F 12/53; B22F 10/30; B22F 10/16;
(Continued)

(56) References Cited

U.S. PATENT DOCUMENTS

| 5,387,380 A | 2/1995 | Cima et al. |
| 2011/0190446 A1 | 8/2011 | Matsui et al. |

(Continued)

FOREIGN PATENT DOCUMENTS

| CN | 104550900 A | 4/2015 |
| CN | 105269814 A * | 1/2016 |

(Continued)

*Primary Examiner* — Dana Ross
*Assistant Examiner* — Adam M Eckardt
(74) *Attorney, Agent, or Firm* — Harness, Dickey & Pierce, P.L.C.

(57) ABSTRACT

A device for manufacturing a three-dimensional shaped object includes a table on which a layer of granulated powder is stacked, a layer formation portion that forms the granulated powder on the table into a layer having a predetermined thickness, a compression unit configured to compress a first region in the layer, a processing unit that processes the formation region of the three-dimensional shaped object in the layer, and a control unit that controls the compression unit to form the first region in which the granulated powder are crushed, and the second region in which the granulated powder are not crushed.

3 Claims, 9 Drawing Sheets

(51) Int. Cl.
*B22F 10/28* (2021.01)
*B22F 10/73* (2021.01)
*B22F 12/00* (2021.01)
*B22F 12/49* (2021.01)
*B22F 12/63* (2021.01)
*B28B 1/00* (2006.01)
*C04B 35/111* (2006.01)
*C04B 35/634* (2006.01)

(52) U.S. Cl.
CPC .............. *B22F 10/73* (2021.01); *B28B 1/001* (2013.01); *C04B 35/111* (2013.01); *C04B 35/63488* (2013.01); *B22F 12/222* (2021.01); *B22F 12/49* (2021.01); *B22F 12/63* (2021.01); *B22F 2304/10* (2013.01)

(58) Field of Classification Search
CPC .......... B22F 10/00; B22F 10/28; B22F 12/50; B22F 10/43; B22F 10/64; B22F 1/16; B22F 10/34; B22F 12/55; B22F 3/006; B22F 1/0003; B22F 3/16; B22F 10/73; B22F 12/222; B22F 12/49; B22F 12/63; B22F 2998/10; B22F 2999/00; B22F 3/003; B22F 3/10; B22F 3/105; B23K 35/0244; B23K 35/3033; B23K 26/342; B23K 15/0086; B23K 26/34; B23K 26/0006; B23K 35/02; C04B 35/111; C04B 35/63488; C04B 35/63416; C04B 35/00; C04B 35/62807; C04B 35/62813; C04B 35/6316; C04B 35/63424; C04B 35/62842; C04B 35/62802; C04B 35/6303; C04B 35/62821; C04B 35/622; C04B 35/581; C04B 35/117; C04B 35/64; C04B 35/653; C04B 35/14; C04B 35/634; B33Y 30/00; B33Y 10/00; B33Y 50/02; B33Y 70/00; B33Y 80/00; B33Y 70/10; B33Y 40/00; B33Y 40/20; B33Y 40/10; B29C 64/165; B29C 64/214; B29C 64/393; B29C 64/218; B29C 64/153; B29C 67/04; B29C 64/241; B29C 67/00; B29C 64/188; B29C 67/243; B29C 41/006; B29C 67/02; B29C 41/12; B29C 41/36; B29C 64/314; B29C 64/236; B29C 64/264; B29C 64/255; B29C 64/321; B29C 64/245; B29C 64/268; B29C 64/364; B29C 64/357; B29C 64/20; B29C 64/194; B29C 64/10; B29C 64/336; C22C 29/08; C22C 33/0285; C22C 1/0433; C22C 29/067; C22C 45/008; C22C 33/003; C22C 1/05; C22C 32/00; C22C 29/06; B29B 9/12; B29B 9/16; B41J 2/09; B41J 2/01; B41J 2/085; B05C 19/04; H05K 3/102; H05K 9/00; C03B 19/00; C03C 10/00; C03C 3/125; H01B 11/16; H01B 11/06

See application file for complete search history.

(56) References Cited

U.S. PATENT DOCUMENTS

| | | |
|---|---|---|
| 2013/0277891 A1 | 10/2013 | Teulet |
| 2014/0227123 A1 | 8/2014 | Gunster et al. |
| 2015/0104346 A1 | 4/2015 | Nakamura et al. |
| 2015/0273622 A1* | 10/2015 | Manabe ............... B22F 10/28 219/76.1 |
| 2017/0189960 A1 | 7/2017 | Ibe |
| 2017/0312822 A1 | 11/2017 | Kimblad |
| 2017/0312824 A1 | 11/2017 | Harrysson |
| 2018/0001559 A1 | 1/2018 | Paternoster et al. |
| 2018/0050491 A1* | 2/2018 | Ishihara ............... B33Y 10/00 |
| 2018/0147627 A1 | 5/2018 | Nakamura et al. |
| 2018/0206952 A1 | 7/2018 | Korten et al. |
| 2019/0047220 A1* | 2/2019 | Ojima ................. B33Y 70/00 |
| 2019/0084227 A1 | 3/2019 | Paternoster et al. |
| 2019/0111585 A1* | 4/2019 | Ma ..................... C04B 35/111 |
| 2019/0134705 A1 | 5/2019 | Sheinman et al. |
| 2019/0232367 A1 | 8/2019 | Sheinman et al. |
| 2020/0198178 A1 | 6/2020 | Monroe et al. |

FOREIGN PATENT DOCUMENTS

| | | | |
|---|---|---|---|
| CN | 107553900 A | 1/2018 | |
| JP | H08-294785 A | 11/1996 | |
| JP | 2011-156783 A | 8/2011 | |
| JP | 2014-522331 A | 9/2014 | |
| JP | 2015-096646 A | 5/2015 | |
| JP | 2015-105201 A | 6/2015 | |
| JP | 2017-100292 A | 6/2017 | |
| JP | 2017-127997 A | 7/2017 | |
| JP | 6193493 B2 | 9/2017 | |
| JP | 2017-214658 A | 12/2017 | |
| JP | 2018-508650 A | 3/2018 | |
| JP | 2018-508651 A | 3/2018 | |
| JP | 2018-090841 A | 6/2018 | |
| JP | 6339704 B2 | 6/2018 | |
| JP | 2018-528796 A | 10/2018 | |
| WO | WO-2017149014 A1 * | 9/2017 | ............ B22F 3/1055 |
| WO | 2017-179052 A1 | 10/2017 | |

\* cited by examiner

FIG. 3
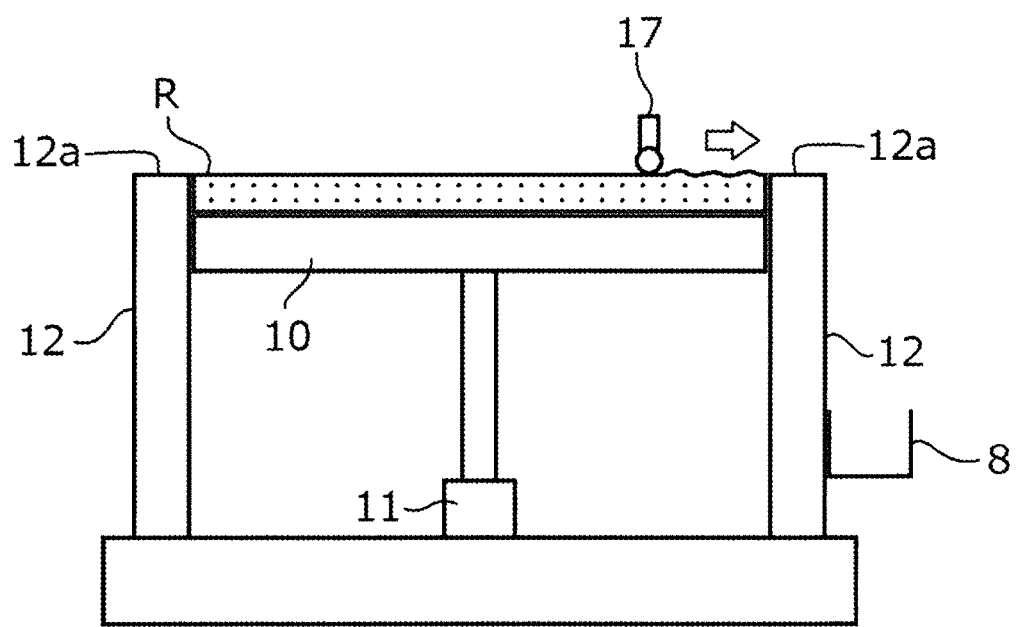
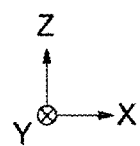

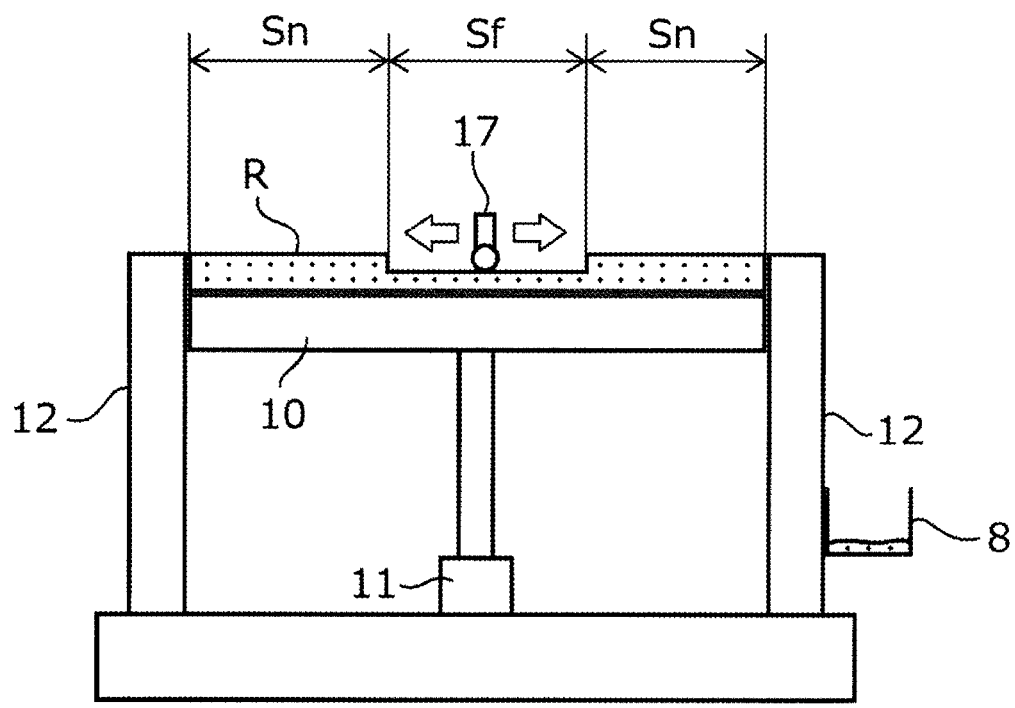
FIG. 4
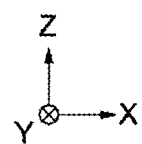

DEVICE FOR MANUFACTURING THREE-DIMENSIONAL SHAPED OBJECT AND METHOD FOR MANUFACTURING THREE-DIMENSIONAL SHAPED OBJECT

The present application is based on, and claims priority from, JP Application Serial Number 2018-198564, filed Oct. 22, 2018, the disclosure of which is hereby incorporated by reference herein in its entirety.

BACKGROUND

1. Technical Field

The present disclosure relates to a device for manufacturing a three-dimensional shaped object and a method for manufacturing the three-dimensional shaped object.

2. Related Art

In a related art, various methods of manufacturing a three-dimensional shaped object are used. Among them, there is a method for manufacturing in which a three-dimensional shaped object is manufactured by stacking a layer of configuration materials of a three-dimensional shaped object on a table.

For example, in JP-A-2015-96646, a method for manufacturing a three-dimensional shaped object, is disclosed, in which the three-dimensional shaped object is manufactured by stacking a layer of powder, as a configuration material of a three-dimensional shaped object, for laser sintering in a container as a table, and by irradiating a portion corresponding to the three-dimensional shaped object in the layer with a laser.

In JP-A-2015-96646, a configuration is disclosed in which a layer of powder for laser sintering can be pressed by a pressing mechanism. Therefore, by performing a method for manufacturing a three-dimensional shaped object in JP-A-2015-96646, the layer of powder for laser sintering can be consolidated, and volume contraction or the like accompanying sintering can be suppressed.

When manufacturing the three-dimensional shaped object, valuable or expensive material as configuration material of the three-dimensional shaped object may be used. Therefore, the configuration material not used when manufacturing the three-dimensional shaped object such as the configuration material disposed on a region other than a region corresponding to the three-dimensional shaped object, may be reused. However, in a configuration disclosed in JP-A-2015-96646, since granulated powder is used as a configuration material and the entire layer configured with the granulated powder is pressurized, a granular form of granulation is changed by compressing the configuration material of the entire layer, and there is a case where it is not possible to reuse the configuration material not used when manufacturing the three-dimensional shaped object.

SUMMARY

A device for manufacturing a three-dimensional shaped object according to an aspect of the present disclosure includes: a table on which a layer of granulated powder is stacked; a layer formation portion that forms the granulated powder on the table into a layer having a predetermined thickness; a compression unit configured to compress a first region in the layer; a processing unit that processes the formation region of a three-dimensional shaped object in the layer; and a control unit that controls the compression unit so as to form the first region in which the granulated powder is crushed, and the second region in which the granulated powder is not crushed.

BRIEF DESCRIPTION OF THE DRAWINGS

FIG. 3 is a schematic side sectional view illustrating a state of the device for manufacturing a three-dimensional shaped object in a layer formation step when performing the method for manufacturing a three-dimensional shaped object.

FIG. 4 is a schematic side sectional view illustrating a state of the device for manufacturing a three-dimensional shaped object in a compression step when performing the method for manufacturing a three-dimensional shaped object.

DESCRIPTION OF EXEMPLARY EMBODIMENTS

Figure 1:
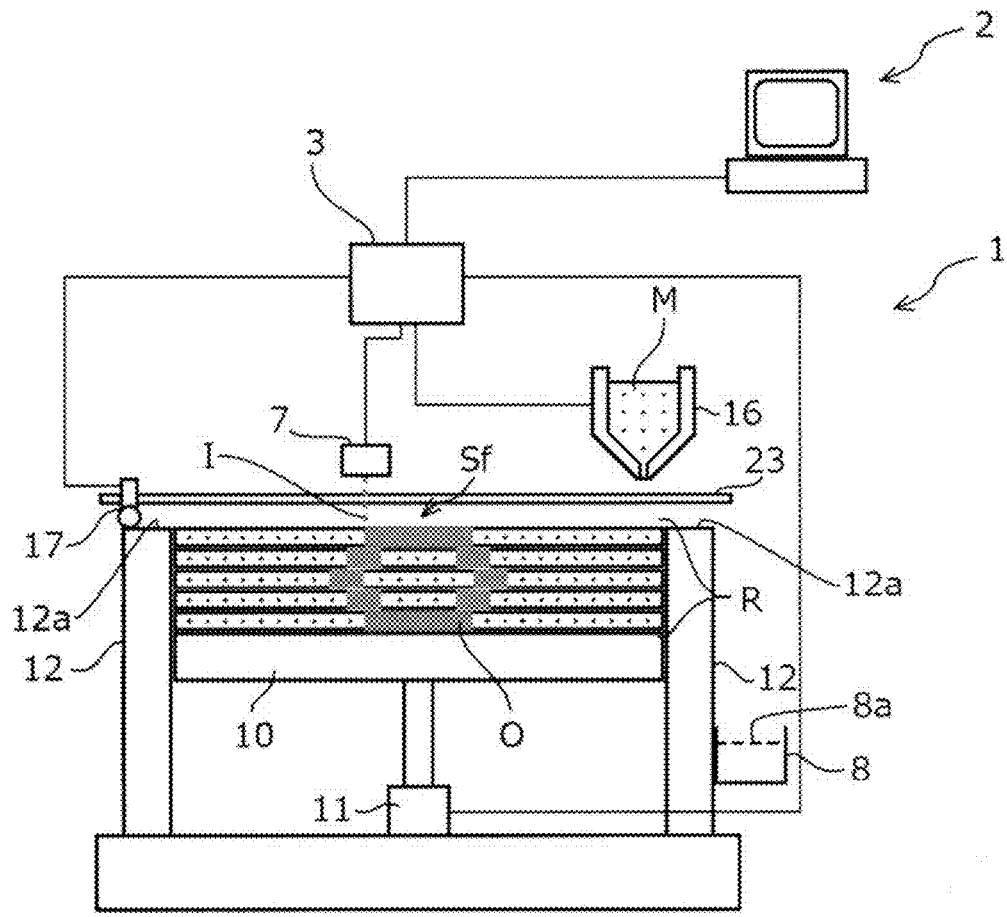
FIG. 1 is a schematic diagram illustrating a configuration of a device for manufacturing a three-dimensional shaped object according to embodiment 1 of the present disclosure.

First, the present disclosure will be schematically described.

A device for manufacturing a three-dimensional shaped object according to a first aspect of the present disclosure includes: a table on which a layer of granulated powder is stacked; a layer formation portion that forms the granulated powder on the table into a layer having a predetermined thickness; a compression unit configured to compress a first region in the layer; a processing unit that processes the formation region of a three-dimensional shaped object in the layer, and a control unit that controls the compression unit so as to form the first region in which the granulated powder is crushed, and the second region in which the granulated powder is not crushed.

According to the configuration, the granulated powder is used. Since the granulated powder has fine particles and is formed bulky, layer formation is simply performed, in which non-uniformity in layer thickness and non-uniformity in density in a film thickness direction due to low fluidity, can be suppressed when a layer is formed by using fine particles, by using bulky granulated powder. In addition, since the layer is compressed to crush the granulated powder in the first region, and not to crush the granulated powder in the second region, the three-dimensional shaped object can be consolidated with fine particles by crushing the granulated powder in the formation region, and the granulated powder of the second region can be reused by not crushing the granulated powder in the second region.

The device for manufacturing a three-dimensional shaped object of a second aspect of the present disclosure is directed to the first aspect, in which the device includes a recovery unit that recovers the granulated powder in the second region.

According to the configuration, since there is provided the recovery unit that recovers the granulated powder in the second region, it is possible to easily recover the granulated powder which can be reused.

The device for manufacturing a three-dimensional shaped object of a third aspect of the present disclosure is directed to the second aspect, in which the recovery unit includes a sieve that divides the granulated powder which is crushed and the granulated powder which is not crushed.

According to the configuration, it is possible to simply divide the granulated powder which is crushed and the granulated powder which is not crushed by the sieve.

The device for manufacturing a three-dimensional shaped object of a fourth aspect of the present disclosure is directed to any one of the first to third aspects, in which the processing unit is a binder applying unit that forms a shape of the three-dimensional shaped object by applying a binder to the formation region.

According to the configuration, since a shape of the three-dimensional shaped object is formed by applying the binder to the formation region, it is possible to easily form the shape of the three-dimensional shaped object.

The device for manufacturing a three-dimensional shaped object of a fifth aspect of the present disclosure is directed to any one of the first to third aspects, in which the processing unit is a laser irradiation unit that forms a shape of the three-dimensional shaped object by irradiating the formation region with a laser.

According to the configuration, since a shape of the three-dimensional shaped object is formed by irradiating a laser in the formation region, it is possible to process efficiently sintering or melting, for example, in the formation region, and it is possible to manufacture a robust three-dimensional shaped object made of metal.

A method for manufacturing a three-dimensional shaped object according to a sixth aspect of the present disclosure includes: a layer formation step of forming granulated powder into a layer having a predetermined thickness on a table on which a layer of the granulated powder is stacked; a compression step of compressing a first region in the layer; and a processing step of processing the formation region of a three-dimensional shaped object in the layer, in which in the compression step, control is performed so as to crush the granulated powder in the formation region, and so as not to crush the granulated powder in a second region in which the three-dimensional shaped object is not formed in the layer.

According to the configuration, the granulated powder is used. Since the granulated powder has fine particles and is formed bulky, layer formation is simply performed, which can suppress scattering of powdery material and the like by using such bulky granulated powder. In addition, since the layer is compressed to crush the granulated powder in the first region, and not to crush the granulated powder in the second region, the three-dimensional shaped object can be consolidated with fine particles by crushing the granulated powder in the formation region, and the granulated powder of the second region can be reused by not crushing the granulated powder in the second region.

The method for manufacturing a three-dimensional shaped object of a seventh aspect of the present disclosure is directed to the sixth aspect, in which the method further includes a recovery step of recovering the granulated powder in the second region in a recovery unit.

According to the configuration, since there is provided the recovery step of recovering the granulated powder in the second region in the recovery unit, it is possible to simply recover the granulated powder which can be reused.

The method for manufacturing a three-dimensional shaped object of an eighth aspect of the present disclosure is directed to the seventh aspect, in which, in the layer formation step, the layer having a thickness of a first distance is formed by lowering the table interposed between wall portions facing each other, of which positions of top portions have the same height, to a first position below by the first distance from the position of the top portion, and moving a roller, which is movable in parallel with the table, at least from one of the top portions to the other, in the compression step, the formation region is compressed by lowering the roller from the position of the top portion by a second distance and moving the roller over a range of the formation region in parallel with the table or by raising the table to a second position above by the second distance from the first position and moving the roller over the range of the formation region in parallel with the table, and in the recovery step, the granulated powder in the second region is recovered by disposing the table on the second position, and moving the roller at least from one of the top portions to the other.

According to the configuration, it is possible to consolidate the three-dimensional shaped object and it is possible to efficiently reuse the granulated powder by a simple combination of the roller which can be moved in parallel with the table which can move up and down.

The method for manufacturing a three-dimensional shaped object of a ninth aspect of the present disclosure is directed to one of the sixth to eighth aspects, in which the processing step is a binder application step of forming a shape of the three-dimensional shaped object by applying a binder to the formation region.

According to the configuration, since the shape of the three-dimensional shaped object is formed by applying the binder to the formation region, it is possible to simply form the shape of the three-dimensional shaped object.

The method for manufacturing a three-dimensional shaped object of a tenth aspect of the present disclosure is directed to any one of the sixth to eighth aspects, in which the processing step is a laser irradiation step of forming a shape of the three-dimensional shaped object by irradiating the formation region with a laser.

According to the configuration, since the shape of the three-dimensional shaped object is formed by irradiating the formation region with the laser, it is possible to manufacture a robust three-dimensional shaped object without performing, for example, separate sintering or the like.

The method for manufacturing a three-dimensional shaped object of an eleventh aspect of the present disclosure is directed to any one of the sixth to tenth aspects, in which, in the processing step, a wall is formed between the first region and the second region in the layer.

According to the configuration, since the wall is formed between the first region and the second region, it is possible to suppress the crushing of the granulated powder in the second region by transmitting force accompanying the compression to the second region as the formation region is compressed. Therefore, it is possible to suppress that the granulated powder is crushed in the second region and the recovery efficiency of the granulated powder is reduced.

Hereinafter, with reference to the drawings, embodiments according to the present disclosure will be described.

Embodiment 1 (FIG. 1 to FIG. 7)

First, an outline of a device for manufacturing a three-dimensional shaped object 1 according to embodiment 1 of the present disclosure will be described with reference to FIG. 1.

Here, an X direction in the figure is a horizontal direction, a Y direction is a horizontal direction and a direction orthogonal to the X direction, and a Z direction is a vertical direction.

The device for manufacturing a three-dimensional shaped object 1 of the present embodiment includes a control unit 3 which is connected to a PC 2 and receives formation data from the PC 2. In addition, a table 10 in which a position of a top portion 12a is sandwiched by a wall portion 12 of the same height, a supply unit 16 that supplies a granulated powder M as a configuration material of a three-dimensional shaped object O on the top portion 12a or the table 10, a roller 17 that forms a layer R of the granulated powder M having a predetermined thickness by leveling the granulated powder M supplied to the table 10 disposed in a predetermined position, and a discharge unit 7 that forms a shape of the three-dimensional shaped object O by discharging a fluid I containing a binder to a formation region Sf of the three-dimensional shaped object O in the layer R. Here, when the granulated powder M is supplied on the top portion 12a, the layer R is formed while the granulated powder M supplied on the top portion 12a is moved from the top portion 12a onto the table 10 by using the roller 17. In addition, on one side end portion of the wall portion 12 in the X direction, a recovery unit 8 which can recover the granulated powder M not used for the formation of the three-dimensional shaped object O, is provided.

Here, the table 10 is configured to be movable along the Z direction which is a stacking direction by a table driving unit 11 connected to the control unit 3. In addition, the supply unit 16 is connected to the control unit 3 and is configured to be movable in a horizontal direction intersecting the Z direction. In addition, the roller 17 is configured to extend in the Y direction, is connected to the control unit 3, and is configured to be movable along the X direction along a guide rail 23 extending in the X direction. In addition, the guide rail 23 is configured to be movable along the Z direction. Since the guide rail 23 has such a configuration, the roller 17 is also movable along the Z direction as along with the movement of the guide rail 23.

The device for manufacturing a three-dimensional shaped object 1 of the present embodiment is the device for manufacturing a three-dimensional shaped object which manufactures the three-dimensional shaped object O by stacking the layer R, by such a configuration. In addition, the roller serves as a layer formation portion for leveling the granulated powder M placed on the top portion 12a or the table 10 to a predetermined thickness by moving along the X direction from the top portion 12a on one side to the top portion 12a on the other side, and serves as a compression unit which can compress at least the formation region Sf of the three-dimensional shaped object O in the layer R. However, the layer formation portion and the compression unit may be configured separately, for example, the layer formation portion is configured by a squeegee or the like and the compression unit is configured by the roller or the like.

Here, once summarized, the device for manufacturing a three-dimensional shaped object 1 according to the present embodiment includes the supply unit 16 of supplying the granulated powder M and the table 10 on which the granulated powder M supplied from the supply unit 16 is placed. In addition, there is provided a roller 17 which serves as the layer formation unit of forming the granulated powder M placed on the table 10 to a layer R of a predetermined thickness and as the compression unit which can compress the formation region Sf of the three-dimensional shaped object O in the layer R. In addition, there is provided the discharge unit 7 as a processing unit of processing the formation region Sf in the layer R. Here, as described above, a supply destination of the granulated powder M to be supplied from the supply unit 16 may be a portion on the table 10, and may be a portion on a top portion 12a.

Details will be described below by using FIG. 2 to FIG. 7. In the control unit 3 of the device for manufacturing a three-dimensional shaped object 1 of the present embodiment, the granulated powder M is crushed in the formation region Sf of the three-dimensional shaped object O in the layer R, and the granulated powder M is not crushed on a second region Sn in which the three-dimensional shaped object O in the layer R is not formed, and thus, it is possible to control the roller 17 as the compression unit.

The granulated powder M is formed by putting together a plurality of fine particles such as metal and ceramic with the binder such as polyvinyl alcohol, is easily crushed by pressing or the like, and a bulky particle which is less likely to disperse dust or the like when crushing or the like. The granulated powder M is not particularly limited, but those which can be crushed by the weight of 1 MPa or less and are processed into substantially spherical particles having the diameter of 50 μm by a plurality of metal fine particles having an average particle diameter of approximately 5 μm, can be preferably used. By using the bulky granulated powder M in this manner, the device for manufacturing a three-dimensional shaped object 1 of the present embodiment can suppress the non-uniformity of a layer thickness and the non-uniformity of the density in a film thickness direction which occur when forming a layer by using the plurality of fine particles. In addition, scattering of the plurality of fine particles can also be suppressed, and the layer R can be stably formed. In addition, by compressing the layer R to crush the granulated powder M in the formation region Sf and not to crush the granulated powder M in the second region Sn, that is, by crushing the granulated powder M in the formation region Sf, the three-dimensional shaped object O can be consolidated with fine particles, and by not crushing the granulated powder M in the second region Sn, the granulated powder M of the second region Sn can be reused. Here, the crush means that it becomes a state of a layer in which it is flatly crushed by pressing, the granulated powder M processed into particles is compressed into a flat shape, and a plurality of the granulated powders M in the flat shape are continuously connected.

In addition, as described above, the device for manufacturing a three-dimensional shaped object 1 of the present embodiment includes the recovery unit 8, and is configured to be able to recover the granulated powder M not used for the formation of the three-dimensional shaped object O and not crushed with the manufacture of the three-dimensional shaped object such as the granulated powder M in the second region Sn. Therefore, since the device for manufacturing a three-dimensional shaped object 1 of the present embodiment can collect the granulated powder M which can be reused as it is such as the granulated powder M in the second region Sn, the device is configured to be able to easily collect the granulated powder M which can be reused. The recovery unit 8 of the present embodiment includes a removable sieve 8a as illustrated in FIG. 1, and is configured to easily divide the crushed granulated powder M and the granulated powder M not crushed, by attaching the sieve 8a having holes finer than the particle diameter of the granulated powder M.

In addition, as described above, the processing unit in the device for manufacturing a three-dimensional shaped object 1 of the present embodiment is the discharge unit 7 which can form a shape of the three-dimensional shaped object O by discharging fluid I including the binder in the formation region Sf in the layer R, and is the binder applying unit which forms the shape of the three-dimensional shaped object O by applying the binder to the formation region Sf. Since the device for manufacturing a three-dimensional shaped object 1 of the present embodiment forms the shape of the three-dimensional shaped object O by applying the binder to the formation region Sf, it is possible to simply form the shape of the three-dimensional shaped object O.

Next, the method for manufacturing a three-dimensional shaped object performed by using the device for manufacturing a three-dimensional shaped object 1 of the present embodiment, that is, specific control of the control unit 3 will be described by using a flowchart of FIG. 2, and FIG. 3 to FIG. 7. In FIG. 3 to FIG. 7, states in which the sieve 8a is removed, are illustrated.

Figure 2:
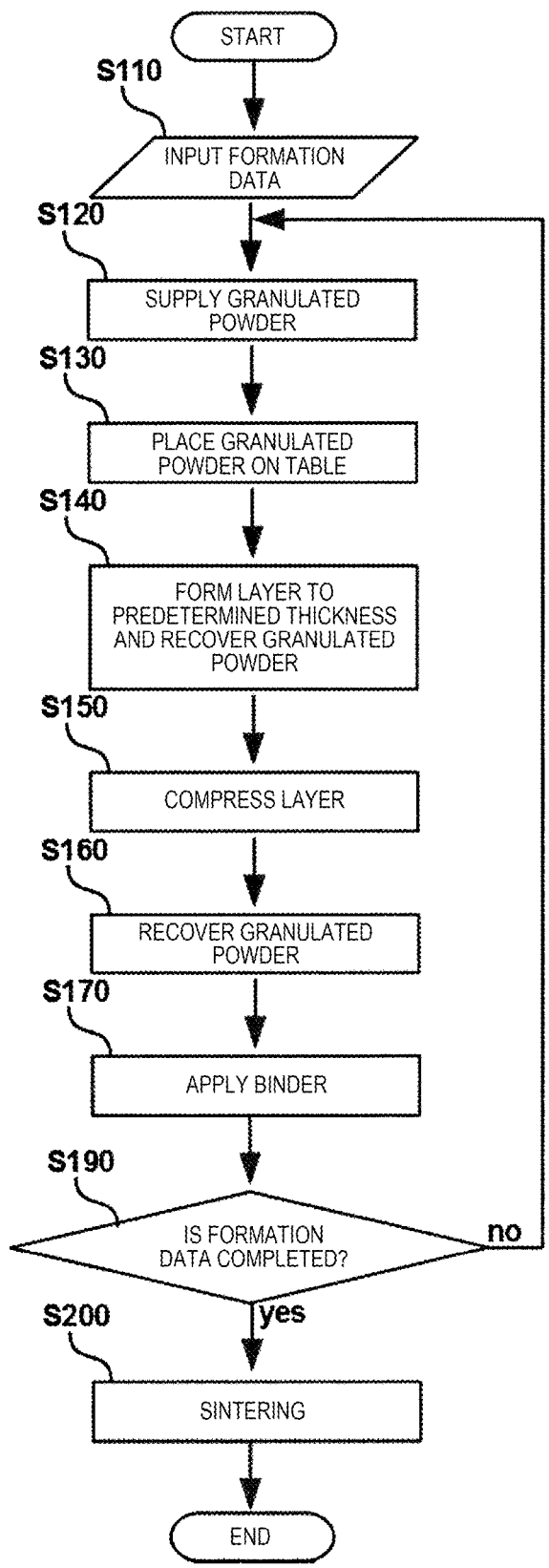
FIG. 2 is a flowchart of a method for manufacturing a three-dimensional shaped object performed by using the device for manufacturing a three-dimensional shaped object according to embodiment 1 of the present disclosure.

In the method for manufacturing a three-dimensional shaped object of the present embodiment, first, as illustrated in a flowchart of FIG. 2, in step S110, the formation data of the three-dimensional shaped object O to be manufactured is input. An input source of the formation data of the three-dimensional shaped object O is not particularly limited, but the formation data can be input to the device for manufacturing a three-dimensional shaped object 1 by using the PC 2 or the like.

Next, in step S120, the supply of the configuration material starts by supplying the granulated powder M which is the configuration material of the three-dimensional shaped object O, from the supply unit 16.

Next, in step S130, the granulated powder M supplied from the supply unit 16 is placed on the table 10. When performing the present step, the table 10 is height-adjusted to a first position, which is a desired position in the Z direction, so that the layer R having a desired thickness can be formed. Specifically, in the present embodiment, the height from the mounting surface of the granulated powder M on the table 10 to the top portion 12a of the wall portion 12 is 100 µm.

Next, in step S140, by moving the roller 17 along the X direction from the top portion 12a on one side to the top portion 12a on the other side as represented by an arrow in FIG. 3, the granulated powder M placed on the table 10 is leveled to a predetermined thickness as represented in FIG. 3. The present step S140 corresponds to a layer formation step of processing the layer R to a predetermined thickness. Furthermore, the present step S140 also corresponds to a recovery step of recovering the granulated powder M unnecessary for the formation of the three-dimensional shaped object O in the recovery unit 8. The granulated powder M recovered in the present step S140 is not compressed and can be reused as it is. The granulated powder M placed on the top portion 12a may be leveled to a predetermined thickness.

Next, in step S150, as illustrated in FIG. 4, the position of the roller 17 in the Z direction is lowered, and by reciprocating the roller 17 in the formation region Sf of the three-dimensional shaped object O along the X direction, the formation region Sf in the layer R is compressed. Here, specifically, in the present embodiment, the distance for lowering the roller 17 is 50 µm. In the present embodiment, in order to compress the formation region Sf in the layer R, the position of the roller 17 in the Z direction is lowered, but instead of lowering the position of the roller 17 in the Z direction, the position of the table 10 in the Z direction may be raised to a second position that is 50 µm higher than the first position.

Figure 5:
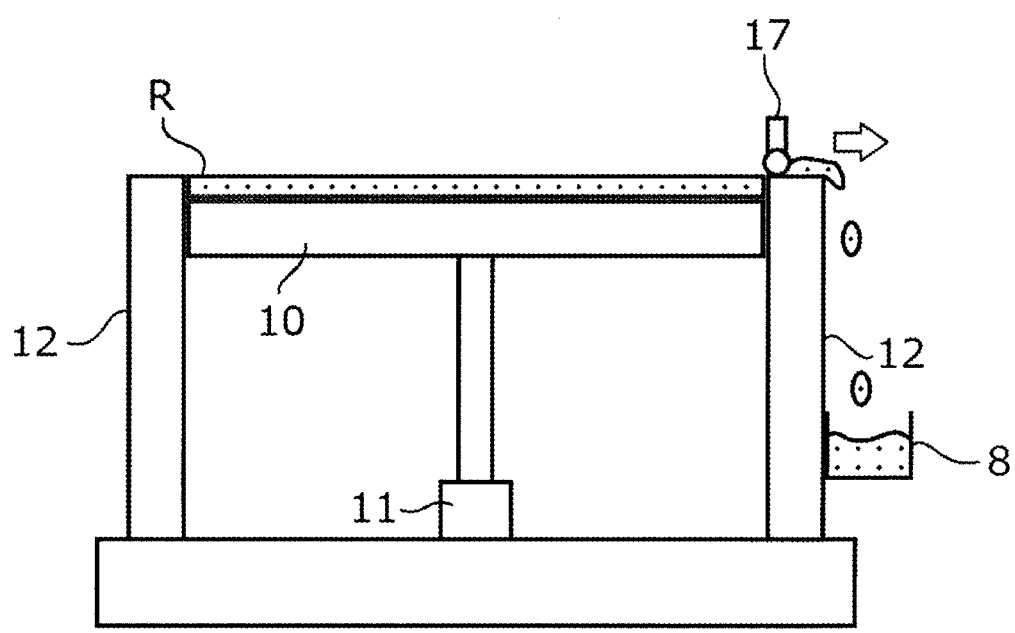
FIG. 5 is a schematic side sectional view illustrating a state of the device for manufacturing a three-dimensional shaped object in a recovery step when performing the method for manufacturing a three-dimensional shaped object.

Next, in step S160, as illustrated in FIG. 5, by raising the position of the table 10 in the Z direction to the second position and moving the roller 17 along the X direction, the granulated powder M placed in the second region Sn where the three-dimensional shaped object O is not formed, is recovered in the recovery unit 8. Here, specifically, in the present embodiment, the distance for raising the table 10 is 50 µm. That is, the thickness of the layer R is 50 µm for both the formation region Sf and the second region Sn, the granulated powder M compressed is placed on the table 10 in the formation region Sf, and the granulated powder M not compressed is placed on the table 10 in the second region Sn.

Next, in step S170, the fluid I including the binder is discharged from the discharge unit 7 to a position in which the shape of the three-dimensional shaped object O is formed based on the formation data is input in step S110 and to a boundary position between the formation region Sf and the second region Sn.

Figure 6:
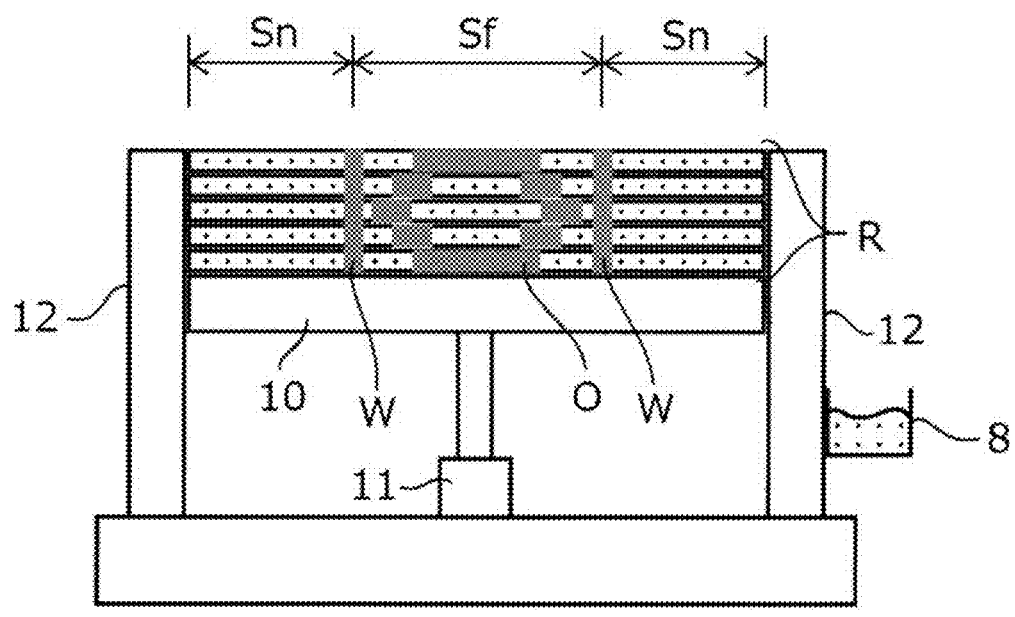
FIG. 6 is a schematic side sectional view illustrating a state of the device for manufacturing a three-dimensional shaped object when the method for manufacturing a three-dimensional shaped object is performed and stacking of layers is completed.

In step S190, it is determined whether or not the formation of the layer R based on the formation data input in step S110, is completed. When it is determined that the formation of the layer R is not completed, that is, when it is determined that the layer R is furthermore stacked, the process returns to step S120 and the next layer R is formed. Meanwhile, when it is determined that the formation of the layer R is completed, the process proceeds to step S200. FIG. 6 illustrates a state in which steps from step S120 to step S190 are repeated five times.

In step S200, a green body formed by repeating steps from step S120 to step S190 by a desired number of times, for example, a green body of the three-dimensional shaped object O as illustrated in FIG. 6, is sintered. Therefore, accompanying the completion of the present step, the method for manufacturing a three-dimensional shaped object of the present embodiment is completed. When the three-dimensional shaped object O is manufactured without requiring sintering, the present step S200 may be omitted.

As described above, the method for manufacturing a three-dimensional shaped object of the present embodiment includes a supply step of the granulated powder M corresponding to step S120, a placing step of placing the granulated powder M supplied in the supply step on the table 10, which corresponds to step S130, a layer formation step of forming the granulated powder M placed on the table 10, which corresponds to step S140, into the layer R of a predetermined thickness, a compression step of compressing the formation region Sf of the three-dimensional shaped object in the layer R, which corresponds to step S150, and a binder application step as a processing step of processing the formation region Sf in the layer R, which corresponds to step S170. Accordingly, in the compression step, it is controlled to crush the granulated powder M in the formation region Sf, and not to crush the granulated powder M in the second region Sn on which the three-dimensional shaped object O is not formed in the layer R. A supply destination of the granulated powder M in the supply step may be a destination on the table 10, and a destination on the top portion 12a. Here, when the supply destination of the granulated powder M is a destination on the table 10, the placing step is performed along with the supply step, and when the supply destination of the granulated powder M is a destination on the top portion 12a, the placing step is performed together with the layer formation step.

By performing the method for manufacturing a three-dimensional shaped object of the present embodiment using the granulated powder M which has fine particles and is formed bulky, it is possible to suppress scattering of powder and the like and to easily form the layer. In addition, since the layer R is compressed to crush the granulated powder M in the formation region Sf and not to crush the granulated powder M in the second region Sn, the three-dimensional shaped object O can be consolidated with fine particles by crushing the granulated powder in the formation region Sf, and the granulated powder M of the second region Sn can be reused by not crushing the granulated powder M in the second region Sn.

In addition, since the method for manufacturing a three-dimensional shaped object of the present embodiment includes the recovery step of recovering the granulated powder M in the second region Sn corresponding to step S160 in a recovery unit 8, it is possible to reuse the granulated powder and it is possible to simply recover the granulated powder M.

In the method for manufacturing a three-dimensional shaped object of the present embodiment, in the layer formation step in step S120, by lowering the table 10 interposed between the wall portions 12 corresponding to the same height as a position of the top portion 12a, from the position of the top portion 12a to the first position which is a first distance lowered by 100 μm, and moving the roller 17 which can be moved in parallel with the table 10 from one at least one of the top portion 12a to the other, the layer R having a thickness corresponding to the first distance, that is, having the thickness of 100 μm, is formed. Accordingly, in the compression step of step S150, the formation region Sf is compressed by lowering the roller 17 from the position of the top portion 12a to 50 μm which is a second distance without changing the position of the table 10 in the Z direction, and by moving a range of the formation region Sf in parallel with the table 10. In the compression step, the roller 17 may be moved over the range of the formation region Sf in parallel with the table 10 by raising the table 10 from the first position to the second position by the second distance without changing the position of the roller 17 in the Z direction. Accordingly, in the recovery step of step S160, the granulated powder M in the second region Sn is recovered by disposing the table 10 at the second position raised from the first position by 50 μm, and by moving the roller 17 from one at least one of the top portion 12a to the other. That is, by performing the method for manufacturing a three-dimensional shaped object of the present embodiment, it is possible to consolidate the three-dimensional shaped object O, and it is possible to effectively reuse the granulated powder M by a simple combination of the roller 17 which can be moved in parallel with the table 10 which can move up and down. Here, the "parallel" is not limited to parallel in a strict sense, and means that it may be substantially parallel.

Figure 7:
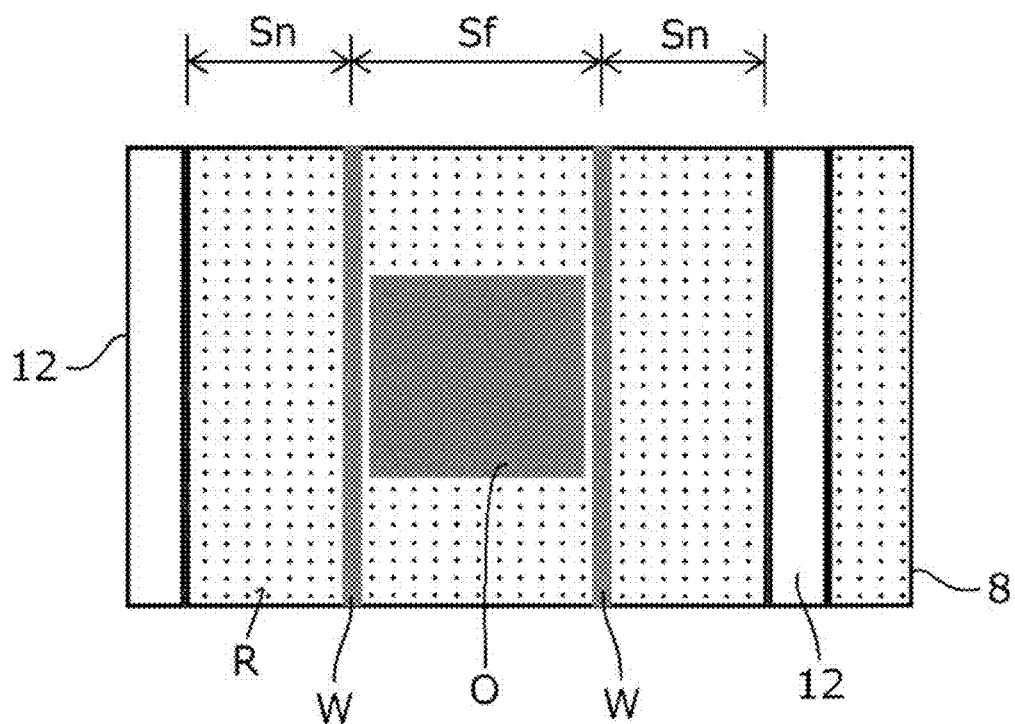
FIG. 7 is a schematic planar sectional view illustrating a state of the device for manufacturing a three-dimensional shaped object when the method for manufacturing a three-dimensional shaped object is performed and the stacking of layers is completed.

In addition, in the method for manufacturing a three-dimensional shaped object of the present embodiment, as illustrated in FIG. 6 and FIG. 7, in a processing step of step S170, a wall W is formed between the formation region Sf and the second region Sn in the layer R. Therefore, it is possible to suppress the crushing of the granulated powder M in the second region Sn by transmitting force accompanying the compression to the second region Sn as the formation region Sf is compressed. Therefore, it is possible to suppress that the granulated powder M is crushed in the second region Sn and the recovery efficiency of the granulated powder is reduced. In the method for manufacturing a three-dimensional shaped object of the present embodiment, since the wall W is formed in the processing step after the compression step, the method can suppress that the granulated powder M in the second region Sn is crushed in the layer R of a lower layer stacked. However, the wall W may be formed before the compression step in order to suppress the crushing of the granulated powder M in the second region Sn in the layer R during the stacking.

Here, the processing step in the method for manufacturing a three-dimensional shaped object of the present embodiment is the binder application step of forming the shape of the three-dimensional shaped object O by applying the binder to the formation region Sf. Therefore, it is possible to simply form the shape of the three-dimensional shaped object O.

However, the processing step is not limited to the binder application step. Hereinafter, embodiments of the device for manufacturing a three-dimensional shaped object 1 and the method for manufacturing a three-dimensional shaped object which can perform the laser irradiation step different from the binder application step as the processing step, will be described.

Figure 8:
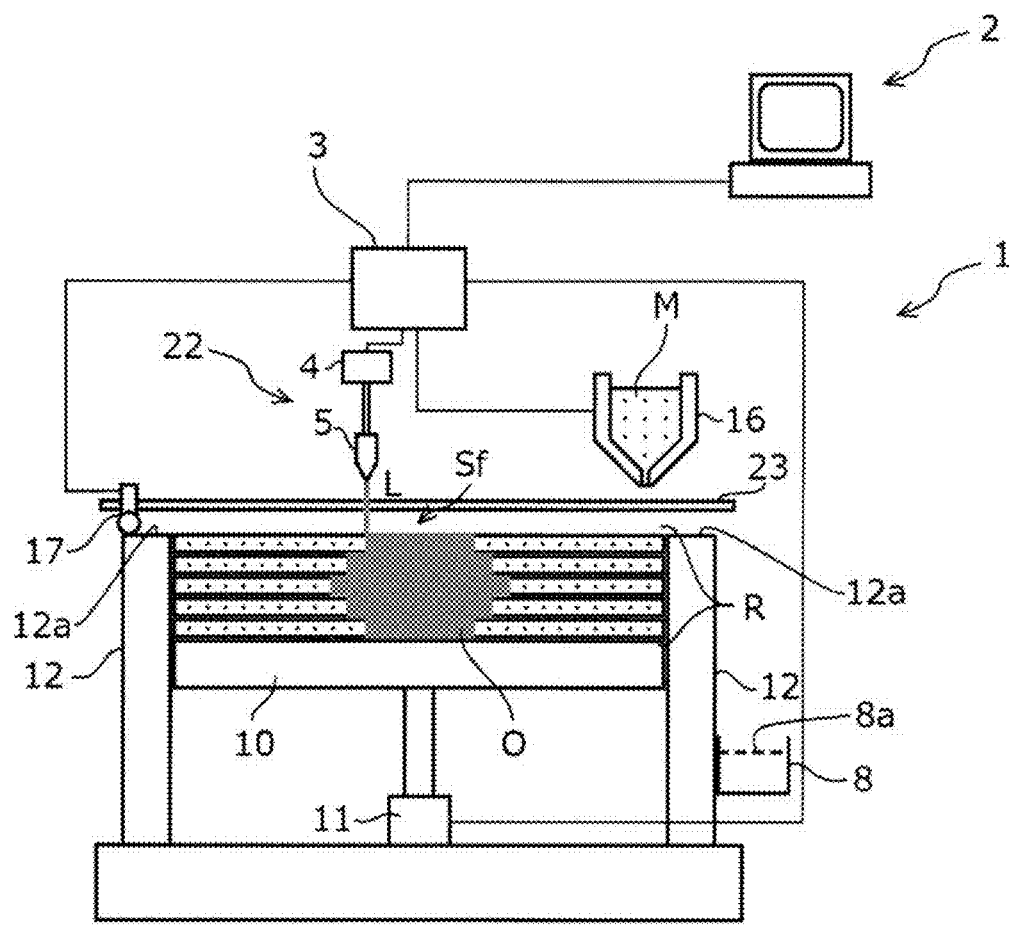
FIG. 8 is a schematic diagram illustrating a configuration of a device for manufacturing a three-dimensional shaped object according to embodiment 2 of the present disclosure.
Figure 9:
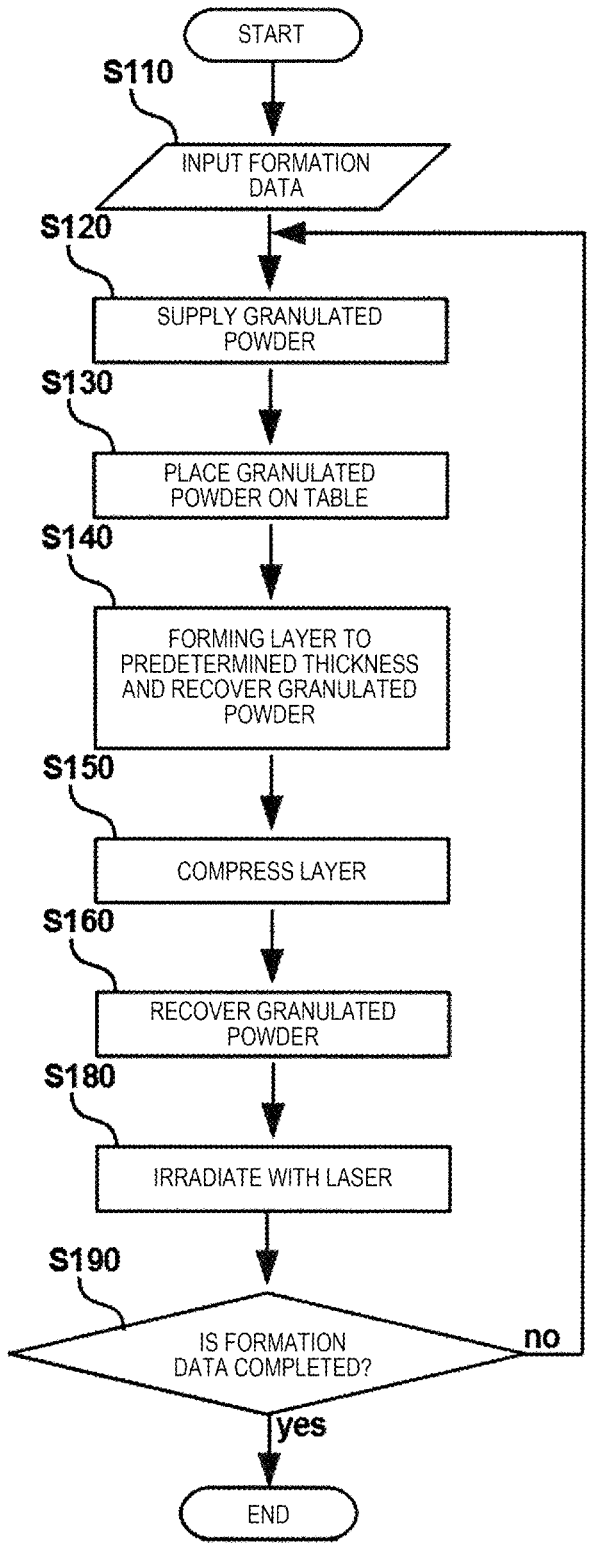
FIG. 9 is a flowchart of a method for manufacturing a three-dimensional shaped object performed by using the device for manufacturing a three-dimensional shaped object according to embodiment 2 of the present disclosure.

Embodiment 2 (FIG. 8 and FIG. 9)

FIG. 8 is a schematic diagram illustrating a device for manufacturing a three-dimensional shaped object 1 of the present embodiment, and is a diagram corresponding to FIG. 1 illustrating the device for manufacturing a three-dimensional shaped object 1 of embodiment 1. In addition, FIG. 9 is a flowchart of an embodiment of the method for manufacturing a three-dimensional shaped object performed by using the device for manufacturing a three-dimensional shaped object 1 of the present embodiment, and is a diagram corresponding to FIG. 2 indicating the flowchart of the method for manufacturing a three-dimensional shaped object of embodiment 1. The components common to those in embodiment 1 are denoted by the same reference numerals, and the detailed description will be omitted. Here, the device for manufacturing a three-dimensional shaped object 1 of the present embodiment has the same configuration as that of the device for manufacturing a three-dimensional shaped object 1 of embodiment 1 except that a laser generation unit 4 and a galvano mirror unit 5 are provided instead of the discharge unit 7.

As illustrated in FIG. 8, the device for manufacturing a three-dimensional shaped object 1 of the present embodiment includes the galvano laser unit 22 as the processing unit including the laser generation unit 4 and the galvano mirror unit 5 which can irradiate a laser L in the formation region Sf of the three-dimensional shaped object O in the layer R of the granulated powder M supplied from the supply unit 16 to the table 10. The galvano laser unit 22 is connected to the control unit 3, and is configured to move a mirror of the galvano mirror unit 5 to emit the laser L generated from the laser generation unit 4 in the desired direction under the control of the control unit 3. In the device for manufacturing a three-dimensional shaped object 1 of the present embodiment, it is possible to form the shape of the three-dimensional shaped object O and perform the sintering of the granulated powder M by irradiating the laser L from the galvano laser unit 22 every time the layer R is formed.

In other representation, the galvano laser unit 22 as the processing unit in the device for manufacturing a three-dimensional shaped object 1 of the present embodiment is the laser irradiation unit that forms the shape of the three-dimensional shaped object O by irradiating the formation region Sf with the laser L. Therefore, it is possible to efficiently proceed sintering or melting in the formation region Sf, and it is possible to manufacture the robust three-dimensional shaped object O, for example, by sintering.

Next, an embodiment of the method for manufacturing a three-dimensional shaped object performed by using the device for manufacturing a three-dimensional shaped object 1 of the present embodiment, will be described by using FIG. 9. The method for manufacturing a three-dimensional shaped object of the present embodiment is the same as that of embodiment 1 except that a sintering step of step S200 is omitted and the laser irradiation step of step S180 is performed instead of the binder application step of step S170 as the processing step with respect to the method for manufacturing a three-dimensional shaped object performed by using the device for manufacturing a three-dimensional shaped object 1 of embodiment 1 illustrated in FIG. 2. Therefore, detail descriptions other than the laser irradiation step of step S180 will be omitted.

In the method for manufacturing a three-dimensional shaped object of the present embodiment, in the laser irradiation step of step S180 as the processing step, the shape of the three-dimensional shaped object O is formed by irradiating the formation region Sf with the laser L. Therefore, for example, the three-dimensional shaped object O using the robust metal particles as the granulated powder M can be simply manufactured without performing, for example, separate sintering or the like.

In addition, in the method for manufacturing a three-dimensional shaped object of the present embodiment, as the granulated powder M to be used, those containing the metal particles and the binder may be preferably used. As the binder, it is possible to preferably use, for example, inorganic bentonite, natural organic waste molasses, lignin sulfonate, starch, konjac powder, sodium alginate, synthetic organic carboxymethyl cellulose, and polyacrylamide other than polyvinyl alcohol, polyethylene, polypropylene and polyacetal. In addition, the binder can also be used as the binder applied in the binder application step.

The present disclosure is not limited to the embodiments described above, and can be realized in various configurations without departing from the scope of the disclosure. The technical features in the embodiments corresponding to the technical features in the respective forms described in the section of the summary of the disclosure can be replaced or combined as appropriate to solve some or all of the problems described above, or to achieve the whole or a part of the effects described above. In addition, if the technical feature is not described as essential in the present specification, it can be deleted as appropriate.

What is claimed is:

1. A device for manufacturing a three-dimensional shaped object comprising:
   a powder supply configured to supply granulated powders onto a table and form a layer of the granulated powders with a leveling roller or a squeegee, the layer having a first area and a second area directly laterally adjacent to each other, only the first area becoming the three-dimensional shaped object;
   a pressing roller pressing the layer of the granulated powders on the table, the pressing roller extending along a first direction;
   a guide rail extending along a second direction perpendicular to the first direction, the pressing roller being movable along the second direction on the guide rail, the guide rail being configured to move along a third direction perpendicular to the first and second directions;
   a discharge head configured to apply a fluid including a binder or a laser beam to the layer; and
   a computer configured to control the powder supply, the pressing roller, the guide rail, and the discharge head to execute:
      adjusting a relative distance between the table and the leveling roller or the squeegee to a first distance;
      causing the leveling roller or the squeegee to move on the granulated powders on the table to form the layer when the relative distance is the first distance;
      adjusting the relative distance to a second distance that is smaller than the first distance;
      causing the pressing roller to repeatedly move, along the guide rail, on and compress only the first area of the layer to form a compressed first area of the layer when the relative distance is the second distance, wherein the second area of the layer is uncompressed by the pressing roller while the compressed first area is formed;
      causing the pressing roller to move from the compressed first area to the second area of the layer to move residual granulated powders on the second area to a recovery tray wherein a thickness of the compressed first area and a thickness of the uncompressed second area are the same;
      causing the discharge head to apply the fluid including the binder or the laser beam to:
         the compressed first area to from part of the three-dimensional shaped object; and
         a border between the compressed first area and the uncompressed second area to form a wall therebetween; and
      repeating the supplying of the granulated powders onto the table, the adjusting of the relative distance, the movement of the pressing roller, and the applying of the fluid including the binder or the laser beam to stack the layers having the compressed first areas and the uncompressed second areas and form the three-dimensional shaped object,
   wherein the wall is formed between the compressed first area and the uncompressed second area in the stacked layers, and
   the wall is spaced apart from the three-dimensional shaped object in the stacked layers.

2. The device for manufacturing a three-dimensional shaped object according to claim 1, wherein the recovery tray includes a sieve that divides the residual granulated powders into the granulated powders which are crushed and the granulated powders which are not crushed.

3. A method for manufacturing a three-dimensional object comprising a computer being configured to execute the steps of:
supplying granulated powders onto a table to form a layer of the granulated powders with a leveling roller or a squeegee, the layer having a first area and a second area directly laterally adjacent to each other, only the first area becoming a three-dimensional shaped object;
adjusting a relative distance between the table and the leveling roller or the squeegee to a first distance;
moving the leveling roller or the squeegee on the granulated powders on the table to form the layer when the relative distance is the first distance;
adjusting the relative distance to a second distance that is smaller than the first distance;
repeatedly moving a pressing roller along a guide rail to compress only the first area of the layer to form a compressed first area of the layer when the relative distance is the second distance, wherein the second area of the layer is uncompressed by the pressing roller while the compressed first area is formed;
moving the pressing roller from the compressed first area to the second area of the layer to move residual granulated powders on the second area to a recovery tray wherein a thickness of the compressed first area and a thickness of the uncompressed second area are the same;
applying a fluid including a binder or a laser beam to:
the compressed first area to from part of the three-dimensional shaped object; and
a border between the compressed first area and the uncompressed second area to form a wall therebetween; and
repeating the supplying of the granulated powders onto the table, the adjusting of the relative distance, the movement of the pressing roller, and the applying of the fluid including the binder or the laser beam to stack the layers having the compressed first areas and the uncompressed second areas and form the three-dimensional shaped object,
wherein the pressing roller extends along a first direction, and the guide rail extends along a second direction perpendicular to the first direction,
the pressing roller is movable along the second direction on the guide rail, and the guide rail is configured to move along a third direction perpendicular to the first and second directions,
the wall is formed between the compressed first area and the uncompressed second area in the stacked layers, and
the wall is spaced apart from the three-dimensional shaped object in the stacked layers.

* * * * *